W. BARBER.
TRAILER LEG SUPPORT.
APPLICATION FILED MAY 8, 1919.
1,415,008.
Patented May 9, 1922.
2 SHEETS—SHEET 1.
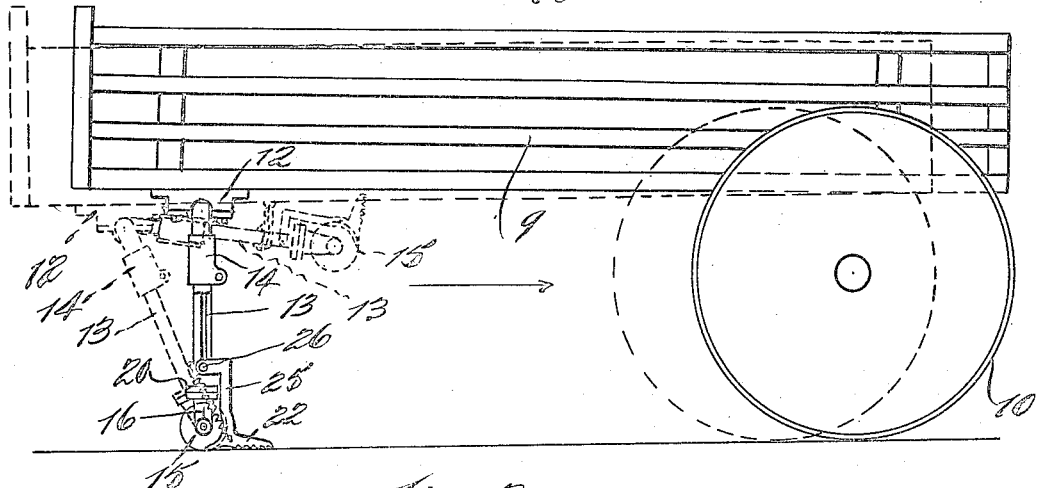
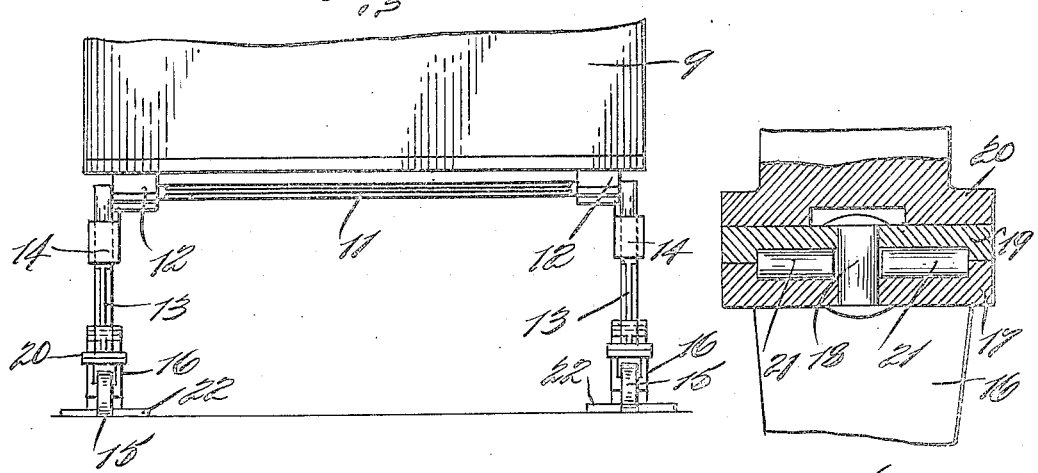
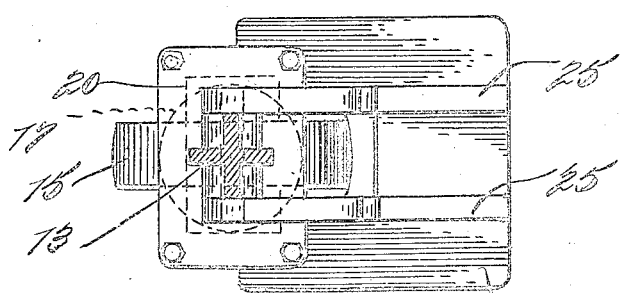
INVENTOR
William Barber
BY
Samuel E. Darby
his ATTORNEY

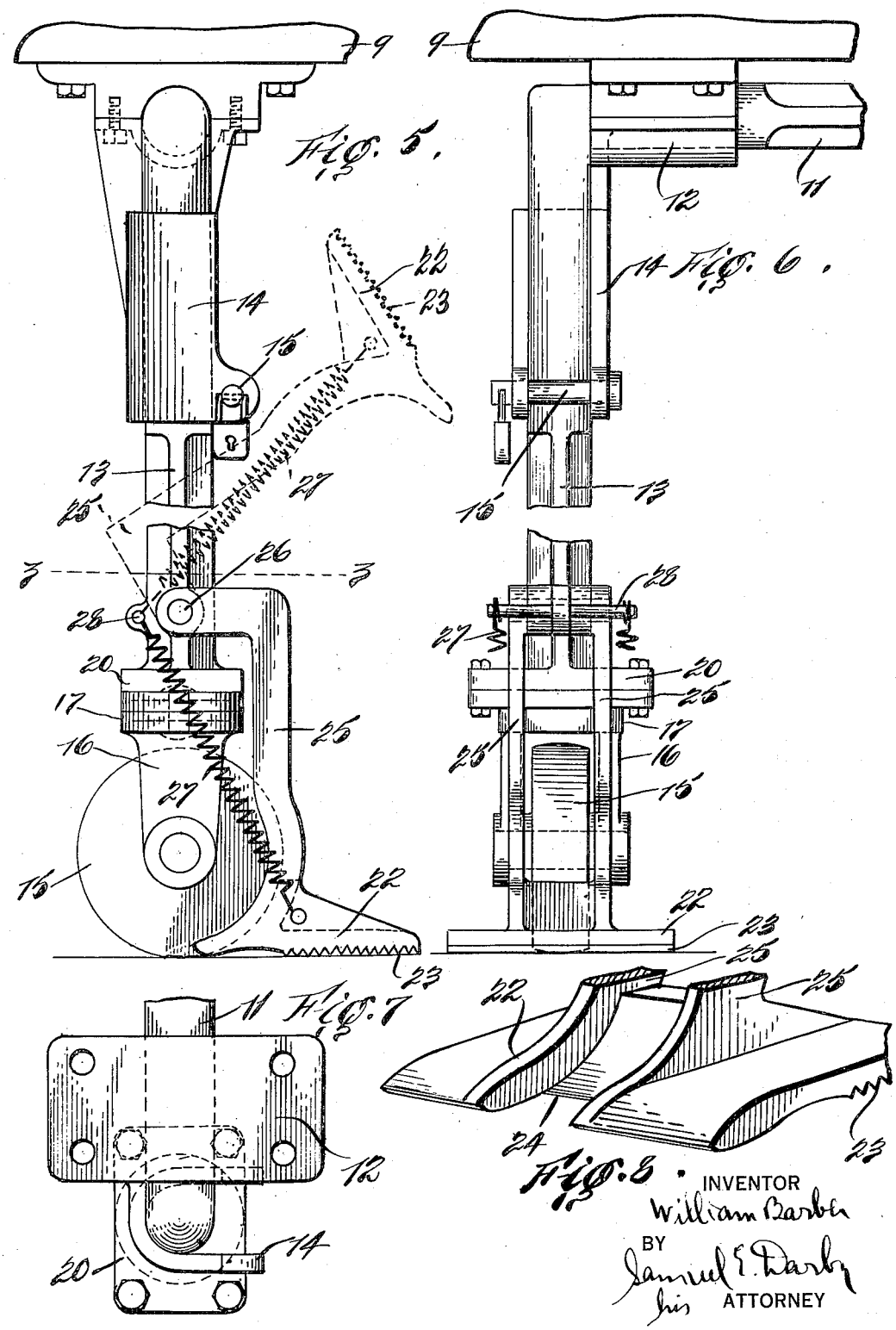

UNITED STATES PATENT OFFICE.

WILLIAM BARBER, OF BROOKLYN, NEW YORK.

TRAILER LEG SUPPORT.

1,415,008.  Specification of Letters Patent.  Patented May 9, 1922.

Application filed May 8, 1919. Serial No. 295,727.

*To all whom it may concern:*

Be it known that I, WILLIAM BARBER, a citizen of the United States, residing at Brooklyn, county of Kings, State of New York, have made a certain new and useful Invention in Trailer Leg Supports, of which the following is a specification.

This invention relates to leg supports for trailers.

The object of the invention is to provide a leg support for truck trailers which is simple in structure and efficient in operation.

A further object of the invention is to provide a leg support for truck trailers which, when desired, may be employed for shifting the trailer, or which will operate to prevent shifting movement of the trailer when detached from the tractor.

A further object of the invention is to provide a combined roller and shoe attachment for trailers of simple construction and which is efficient and easily applied and operated.

Other objects of the invention will appear more fully hereinafter.

The invention consists substantially in the construction, combination, location and relative arrangement of parts, all as will be more fully hereinafter set forth, as shown in the accompanying drawings and finally pointed out in the appended claims.

Referring to the drawings:—

Fig. 1 is a view in side elevation of a trailer showing the application thereto of a combined roller and shoe leg support for one end thereof, a displaced position of the parts being indicated in dotted lines.

Fig. 2 is a view in front elevation of the trailer shown in Fig. 1, showing the application of the roller and leg attachment.

Fig. 3 is a view in section on the line 3, 3, Fig. 5.

Fig. 4 is a broken detail view in section showing swivel connection of a castor.

Fig. 5 is a view in side elevation on a somewhat enlarged scale of a structure of combined roller and leg attachment embodying my invention, a displaced position of the shoe being indicated in dotted lines.

Fig. 6 is a view in front elevation of the construction shown in Fig. 5.

Fig. 7 is a broken view in top plan.

Fig. 8 is a broken detail view in perspective of the shoe.

The same part is designated by the same reference numeral wherever it occurs throughout the several views.

In the operation of trucks it is a common practice to employ tractors and trailers, the trailer being equipped with rear supporting wheels and detachably connected at its front end with the tractor. When the trailer has been detached from the tractor it is necessary to provide some form of means for supporting the front end of the trailer. Various forms of supporting legs have been heretofore provided for this purpose, the legs being hinged to the body of the trailer at its front end and when required for use being swung down to engage the floor or ground and performing the function not only of a support for the front end of the trailer but also of raising the front end of the trailer out of its engagement with the tractor. It is frequently desirable to shift the position of a trailer after it has been detached from the tractor and hence the desirability of equipping the supporting legs with rollers or casters by or upon which the front end of the trailer is supported and which may serve the function of a roller support for the front end of the trailer to permit the trailer to be shifted from one position to another. It is equally desirable, however, to provide means to prevent the shifting movement of the trailer when detached from the tractor. It is among the special purposes of my present invention to provide a combined roller and shoe device for the leg supports of trailers whereby the trailer when detached from its tractor may be carried upon the roller support whenever desired for shifting the trailer, but when it is desired to prevent shifting movement of the trailer the shoe is brought into action to hold the trailer against shifting movement. In this case the shoe is disposed so as to be brought at will into and out of contact with the surface of the floor or ground as occasion may require.

Referring to the drawings,—9 designates the body of a trailer, the rear end of which is supported by the usual wheels 10. A bar 11 extends transversely across and beneath the bottom of the trailer body at its front end and is journaled in boxes 12 at opposite sides of the trailer body. The ends of the bar 11 outside or beyond the boxes 12 are bent downwardly to form leg portions 13. The boxes 12 are formed with stationary open sided sleeve portions 14 which depend vertically therefrom and in which the vertical leg portions 13 of the bar 11 are received, and in which said leg portions may be retained or locked in vertical position in any suitable or convenient manner, as for instance, by means of the retaining pins 15, see Figs. 5 and 6. By removing the retaining pin 15 the legs 13 may be swung up against the underside of the trailer body as indicated in dotted lines in Fig. 1, the bar 11 rocking in its bearing in the blocks 12, and the legs may be locked or otherwise retained in their raised position in any suitable or convenient manner. This retracted position of the leg is the position occupied thereby when the front end of the trailer is supported upon the tractor and the trailer is being operated by the tractor in the ordinary way. When it is desired to detach the trailer from the tractor the legs 13 are rocked downwardly from their raised or retracted positions until contact is effected with the ground and then the tractor is slightly backed until the legs assume their directly vertical position. The front end of the trailer is thereby raised so as to be detached from the tractor, whereupon the tractor may proceed to any other point while the trailer remains in the position in which it is left. It frequently happens in practice that it is desirable to shift the detached trailer from one position to another or to turn it. To permit this, in accordance with my invention, I provide the lower ends of the legs 13 with casters or rollers 15, which, if desired, may be suitably mounted upon the legs 13 so as to permit a caster movement thereof. A simple arrangement for accomplishing this is shown wherein the rollers 15 are journaled in brackets 16 formed at the upper end thereof with a swivel plate 17, see Fig. 4, which is connected by a centrally located vertically arranged pivot stud 18 to a cooperating bearing plate 19 bolted or otherwise secured to a head or flange 20 at the lower ends of the legs 13. If desired, and in order to reduce friction, rollers 21 may be interposed between the bearing plates 17, 19. With this structure it will be observed that the caster rollers 15 may not only rotate upon their own axes but the brackets 16 in which they are journaled may swivel around the vertical pivot stud 18 thus securing the caster roller action in case it may be desired to shift the position of the detached trailer.

If the leg 13 were provided merely with the caster rollers the danger would be incurred of the detached trailer shifting its position when such shifting may be undesired, and therefore a detached trailer would be insecure after being detached from a tractor. In order to prevent this, and to provide means for efficiently holding the detached trailer in any desired position to which it may be shifted, I provide each leg 13 with a shoe member 22 in the form of a flat faced member which on its under surface, and if desired, may be formed with corrugations or teeth as indicated at 23, arranged to lie flatwise upon the floor or surface when said shoe is in position for use. The shoe member is formed with a central depression indicated at 24, see Fig. 8, within which the caster wheel 15 operates, said caster wheel operating to prevent any lateral rocking or displacement of the shoe. Each shoe 22 is carried by yoke arms 25 which are hinged as at 26 to the legs 13 above the swivel connection of the caster roller to the lower ends of said legs so that when the shoes are not required for use they may be rocked or swung upwardly as indicated in dotted lines in Fig. 5. The shoe may be retained in working position or in raised retracted position in any suitable or convenient manner. A simple arrangement is shown where tension springs 27 are connected at one end to a pin or rod 28 carried by the legs 13 and at their other ends at opposite sides of the shoe. The points of connection of the tension springs to the legs and to the shoes respectively are so located with reference to the axes about which the shoe supporting arms 25 rock or swing that when the shoes are in position for use, as shown for example in Fig. 5, the tension of the springs 27 is exerted in a direction to hold the shoes in working position, and likewise when the shoe is rocked into its raised or retracted position the springs 27 pass beyond the dead center plane containing the hinge axes 28, 26, and hence the tension of the springs serves to retain the shoes in their raised or retracted position. With the shoes in their raised position, and the legs 13 standing vertically, the trailer is free to be shifted around upon the caster wheels 15, and when the shoes are in their lowered working position, the trailer is prevented from being shifted and is held in stationary position.

It will be understood that various changes and modifications in details might readily occur to persons skilled in the art and still fall within the spirit and scope of my invention. I do not desire therefore to be limited or restricted to the exact details shown and described.

Having now set forth the objects and nature of my invention, what I claim as new and useful and of my own invention, and desire to secure by Letters Patent is,—

1. A combined wheel and shoe attachment for trailer leg supports, comprising a leg pivoted to the trailer body, a supporting wheel attached at the end of the leg, and a shoe pivotally mounted on the leg at a point above the wheel for movement into and out of working position.

2. The combination with a trailer body, of a supporting leg therefor, pivotally mounted on said body, a wheel bracket swivelly connected to the free end of said leg, and a shoe pivotally carried by said leg from a point above said wheel in pivotal alignment to be movable into and out of working position.

3. The combination with a trailer body, of a supporting leg therefor, said leg being hinged or pivoted to said body, a supporting wheel carried by the free end of said leg, a shoe carried by said leg for movement into and out of working position, and means for yieldingly maintaining said shoe in working position, said means also operating to retain the shoe in retracted position.

4. The combination with a trailer body, of a supporting leg therefor, said leg being hinged or pivoted to said body, a yoke pivotally connected to said leg and a shoe carried by said yoke for movement into and out of position to form a support for the trailer body, and means for yieldingly maintaining said shoe in either working or retracted position.

5. The combination with a trailer body having a vertically disposed bearing sleeve, a supporting leg pivotally connected to said body to be received in said bearing sleeve when rocked down into vertical position, a wheel carried by the free end of said leg and a shoe pivotally mounted on said leg for movement into and out of working position.

6. The combination with a trailer body having a vertically disposed bearing sleeve, a supporting leg pivotally connected to said body to be received in said bearing sleeve when rocked down into vertical position, a wheel carried by the free end of said leg, and a shoe pivotally mounted on said leg at a point above the wheel for movement of said shoe into and out of working position, said shoe when in working position adapted to straddle said wheel and to take the support of the trailer body.

In testimony whereof I have hereunto set my hand on this first day of May, A. D. 1919.

WILLIAM BARBER.